United States Patent
Kerwien et al.

(10) Patent No.: US 11,506,882 B2
(45) Date of Patent: Nov. 22, 2022

(54) METHOD FOR SUPPORTING A USER AIMING AT AN OBJECT WITH A TELESCOPE

(71) Applicant: Carl Zeiss AG, Oberkochen (DE)

(72) Inventors: Norbert Kerwien, Moegglingen (DE); Holger Muenz, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 341 days.

(21) Appl. No.: 16/805,592

(22) Filed: Feb. 28, 2020

(65) Prior Publication Data
US 2020/0278531 A1 Sep. 3, 2020

(30) Foreign Application Priority Data
Feb. 28, 2019 (DE) .................. 10 2019 105 093.6

(51) Int. Cl.
G02B 23/00 (2006.01)
G02B 23/16 (2006.01)
G02B 23/24 (2006.01)

(52) U.S. Cl.
CPC ......... *G02B 23/16* (2013.01); *G02B 23/2407* (2013.01); *G02B 23/2476* (2013.01)

(58) Field of Classification Search
CPC ............... G02B 23/16; G02B 23/2407; G02B 23/2476; G02B 23/00; G02B 23/08; G02B 23/14; G02B 23/24; G01C 3/00; G01C 3/02; G01C 3/04; G01B 11/00; G01B 11/02; G01B 11/026
USPC ....... 359/429, 362, 363, 399, 400, 402, 407; 356/3, 4.01, 3.13, 3.14, 3.15, 20, 21, 614, 356/623
See application file for complete search history.

(56) References Cited

U.S. PATENT DOCUMENTS

| | | | |
|---|---|---|---|
| 4,402,140 A | 9/1983 | Nagae | |
| 4,622,458 A | 11/1986 | Bock et al. | |
| 5,579,165 A | 11/1996 | Michel et al. | |
| 5,764,344 A | 6/1998 | Taniguchi | |
| 6,233,094 B1 | 5/2001 | Tsuda | |
| 8,830,576 B1 | 9/2014 | Morton et al. | |
| 11,060,818 B2 | 7/2021 | Schreiter et al. | |
| 2006/0010697 A1 | 1/2006 | Sieracki et al. | |

(Continued)

FOREIGN PATENT DOCUMENTS

AT 519578 A4 8/2018
CN 110702067 A * 1/2020
(Continued)

OTHER PUBLICATIONS

German Search Report dated Oct. 29, 2019 of German Patent Application No. DE 10 2019 105 093.6 (to which this application claims priority) and English-language translation thereof.
(Continued)

*Primary Examiner* — Arnel C Lavarias
(74) *Attorney, Agent, or Firm* — Ewers IP Law PLLC; Falk Ewers

(57) ABSTRACT

A method for supporting a user aiming at an object with a telescope includes determining and storing a first object position of the object relative to the telescope when a user aims at the object with the telescope and the telescope is located at a first telescope position, and supporting a user when aiming at the object again with the same telescope based on the stored first object position relative to the telescope.

12 Claims, 3 Drawing Sheets

(56) References Cited

U.S. PATENT DOCUMENTS

| | | | |
|---|---|---|---|
| 2008/0163504 A1* | 7/2008 | Smith | G01C 17/30 33/268 |
| 2013/0253820 A1 | 9/2013 | Denk | |
| 2019/0049219 A1 | 2/2019 | Fougnies et al. | |
| 2019/0285383 A1 | 9/2019 | Haag et al. | |

FOREIGN PATENT DOCUMENTS

| | | | |
|---|---|---|---|
| DE | 19633059 A1 | 8/1995 | |
| DE | 10243486 A1 * | 12/2003 | G01C 21/02 |
| DE | 19801519 B4 | 7/2005 | |
| DE | 102006022302 A1 | 11/2007 | |
| DE | 102012003124 B3 | 5/2013 | |
| DE | 102017101118 A1 | 7/2018 | |
| WO | 0051886 A2 | 9/2000 | |

OTHER PUBLICATIONS

Office Action and search report dated Mar. 22, 2021 in Austrian counterpart application No. A 50136/2020 and English-language translation thereof.

* cited by examiner

METHOD FOR SUPPORTING A USER
AIMING AT AN OBJECT WITH A
TELESCOPE

CROSS REFERENCE TO RELATED APPLICATIONS

This application claims priority to German patent application DE 10 2019 105 093.6, filed Feb. 28, 2019, the entire content of which is incorporated herein by reference.

TECHNICAL FIELD

The disclosure relates to a method for supporting a user aiming at an object with a telescope and to a telescope.

BACKGROUND

Objects observed through a telescope occasionally prove difficult to find again for the user of the telescope. The respective object is frequently difficult to find again, in particular if the user has moved away with the telescope from his original observation position.

A disadvantage of telescopes which have been known to date is that finding an object which has been previously aimed at with the telescope is difficult and technically complex.

SUMMARY

It is an object of the disclosure to provide a method and a telescope which can be used to find objects again which have been previously aimed at in a technologically simple manner.

This object is achieved by a method for supporting a user aiming at an object with a telescope and a telescope as described herein.

The object is in particular achieved by a method for supporting a user aiming at an object with a telescope, the method including determining and storing a first object position of the object relative to the telescope when a user aims at the object with the telescope and the telescope is located at a first telescope position, and supporting a user when aiming at the object again with the same telescope based on the stored first object position relative to the telescope.

One advantage of this is that an object that has been aimed at previously can be found again with the telescope, that is to say brought into the field of vision of the telescope, in a technically simple manner. Since no absolute position determination of the object or GPS reception or the like is necessary due to the fact that only the relative position (position of the object relative to the first telescope position) is required, the method can also be used when no GPS reception is available. Moreover, the power consumption in this method is very low, because no GPS signal needs to be received and processed.

In particular, the object is also achieved by a telescope, including an object position determination apparatus for determining and storing a first object position of an object relative to the telescope when the object is aimed at by a user with the telescope and the telescope is located at a first telescope position, and an object aiming support apparatus for supporting a user when aiming at the object again with the telescope based on the stored first object position relative to the telescope.

An advantage here is that an object that has already been aimed at once using the telescope can be aimed at again in a technically simple manner. That means that the object can be brought back into the field of vision or into the center of the field of vision in a technically simple manner. The telescope requires no absolute position determination, that is to say the absolute position of the telescope and/or the object is not required. Only the relative position of the object to the telescope is required. Consequently, no GPS reception or the like is necessary. As a result, the method can also be used when no GPS reception is available. Moreover, the power consumption in this telescope is very low, because no GPS signal needs to be received and processed.

According to an exemplary embodiment of the method, the method further includes determining a second object position of the object relative to the telescope if the telescope was moved from the first telescope position to a second telescope position based on the first object position, the first telescope position and the second telescope position, wherein the supporting of a user aiming at the object again with the same telescope is effected based on the determined second object position relative to the telescope. One advantage of this is that, even if the telescope was moved and a different user uses the telescope, the object can be found and/or aimed at again quickly and in a technically simple manner. No absolute positions or position information are/is required here either. Only relative positions (relative difference between the first telescope position and the second telescope position and relative difference between the first object position and the first telescope position) are required. In particular, no GPS signal is required, which means that the method can be performed in an energy-efficient manner. The second object position is based, among other things, on the first object position.

According to an exemplary embodiment of the method, when supporting the user aiming at the object, a direction is displayed in the field of view of the telescope, wherein the displayed direction indicates the direction in which the viewing direction of the telescope must be changed to bring the object back into the field of view of the telescope, in particular into the center of the field of view. One advantage of this is that the user can identify in an optically simple manner into which direction he must change the viewing direction of the telescope to aim at the object or to bring the object into the field of view of the telescope. The direction can be indicated in particular by way of directional arrows in the field of view of the telescope.

According to an exemplary embodiment of the method, the first object position relative to the telescope is automatically stored when the viewing direction of the telescope has not been significantly changed for a period of time that is longer than a specified or predefined period of time. As a result, the user does not need to become active (for example by pressing a button or the like) for the respective relative object position to the telescope to be stored. This makes it easier to operate. In addition, the user cannot forget to store the respective relative object position. The specified time period can be for example approximately 5 seconds (s), approximately 10 s or approximately 20 s. Minor changes in the viewing direction caused by shaking and/or trembling of the user can be ignored in this case.

According to an exemplary embodiment of the method, the user in the step of determining and storing the first object position of the object and the user in the step of supporting the user when aiming at the object again is the same user, wherein in particular the identity of the user is determined by way of the telescope, typically on the basis of fingerprints.

One advantage of this is that the respective user is supported when aiming at objects that he himself has aimed at with the telescope before. That means that, in cases in which a telescope is used by a plurality of users, the remaining stored object positions of objects that were previously aimed at by another user are not taken into consideration. This makes it easier to find objects again that the respective user has previously aimed at. Consequently, confusion in the user caused by the display or provision of too many object positions is prevented in a technically simple manner. It is of course possible for object positions of other users to be displayed to the user as well or for the user to be supported when aiming at the objects of the object positions of other users. These objects or object positions of other users can be marked explicitly (e.g., by usernames, etc.).

According to an exemplary embodiment of the method, a sharpness value of the telescope is furthermore displayed and/or automatically set in the step of supporting the user when aiming at the object, wherein the sharpness value is a sharpness value that is stored when aiming at the object at the first telescope position or is a sharpness value determined on the basis of the distance between the second telescope position and the second object position. As a result, aiming at an object that has been previously aimed at is further simplified because not only is the user supported when orienting the viewing direction of the telescope into the correct direction (the direction of the object), but the sharpness of the telescope is set to the sharpness, or the corresponding sharpness value is displayed, at which the object can be seen sharply or best through the telescope.

According to an exemplary embodiment of the method, a plurality of second object positions of a plurality of objects relative to the telescope at the second telescope position are determined, wherein, in supporting the user when aiming at the object, a plurality of second object positions of a plurality of objects are provided to the user for selection and/or the respectively necessary direction of the change in viewing direction of the telescope to bring the respective object into the field of view of the telescope is displayed to the user, in particular together with information relating to the respective object. As a result, the user is provided with a selection of objects that have been previously aimed at. This increases the variability of the telescope.

According to an exemplary embodiment of the telescope, the object position determination apparatus is further configured to determine a second object position of the object relative to the telescope when the telescope is located at a second telescope position based on the first object position, the first telescope position and the second telescope position, and the object aiming support apparatus is configured to support a user aiming at the object with the same telescope at the second telescope position based on the determined second object position relative to the telescope. As a result, the object can be aimed at or found again in a technically simple and quick manner when the telescope was moved from the first telescope position to the second telescope position. No absolute position (e.g., longitude and latitude) of the object or of the telescope is required herefor. Only relative positions (relative difference between the first telescope position and the second telescope position and relative difference between the first object position and the first telescope position) are required. In particular, no GPS signal is required, which means that the telescope is particularly energy-efficient.

According to an exemplary embodiment of the telescope, the telescope further includes a sharpness setting apparatus to display and/or automatically set a sharpness value of the telescope when supporting the user aiming at the object at the second telescope position, wherein the sharpness value is a sharpness value that is stored when aiming at the object at the first telescope position or is a sharpness value determined on the basis of a distance between the second telescope position and the object. An advantage of this is that aiming at an object that has been previously aimed at is further simplified because not only can the user be supported when orienting the viewing direction of the telescope into the correct direction (the direction of the object), but the sharpness of the telescope can be set to the sharpness, or the corresponding sharpness value can be displayed, at which the object can be seen sharply or best through the telescope.

According to an exemplary embodiment of the telescope, the object position determination apparatus is configured to automatically store the first object position relative to the telescope at the first telescope position when the viewing direction of the telescope has not been significantly changed for a period of time that is longer than a predefined period of time. This simplifies the operation of the telescope. In addition, the user cannot forget to store an object position. The predefined period of time can be for example approximately 3 s, approximately 5 s, approximately 10 s, or approximately 20 s, or set individually by the user. Minor changes in the viewing direction caused by shaking and/or trembling of the user can be ignored in this case.

According to an exemplary embodiment of the telescope, the telescope further includes a display apparatus to display a direction in the field of view of the telescope, wherein the displayed direction indicates the direction in which the viewing direction of the telescope must be changed to bring the object back into the field of view of the telescope, in particular into the center of the field of view. As a result, the user of the telescope can optically capture in a simple manner into which direction he must change the viewing direction of the telescope to aim at the object or to bring the object into the field of view of the telescope. The direction can be indicated in particular by way of directional arrows in the field of view of the telescope.

BRIEF DESCRIPTION OF THE DRAWINGS

The disclosure will now be described with reference to the drawings wherein.

DESCRIPTION OF EXEMPLARY EMBODIMENTS

Figure 1:
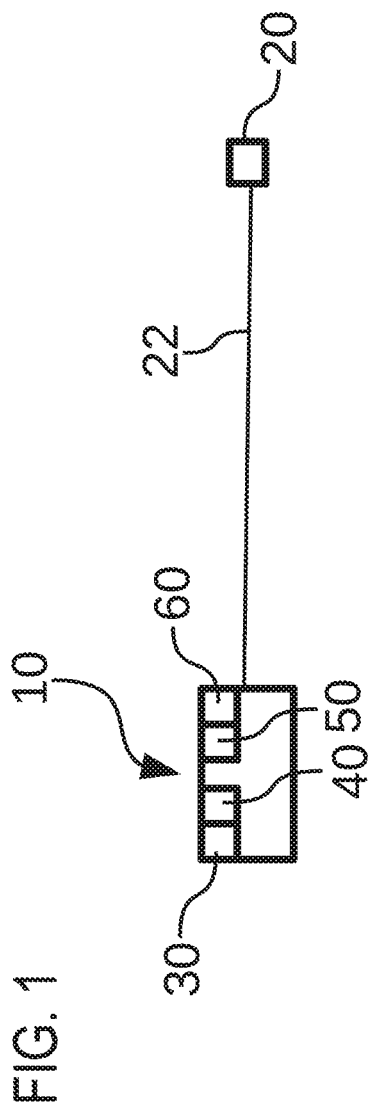
FIG. 1 shows a schematic view of a telescope located at the first telescope position according to an exemplary embodiment of the disclosure.

The same reference numerals are used in the following description for identical parts and parts having an identical effect.

Figure 2:
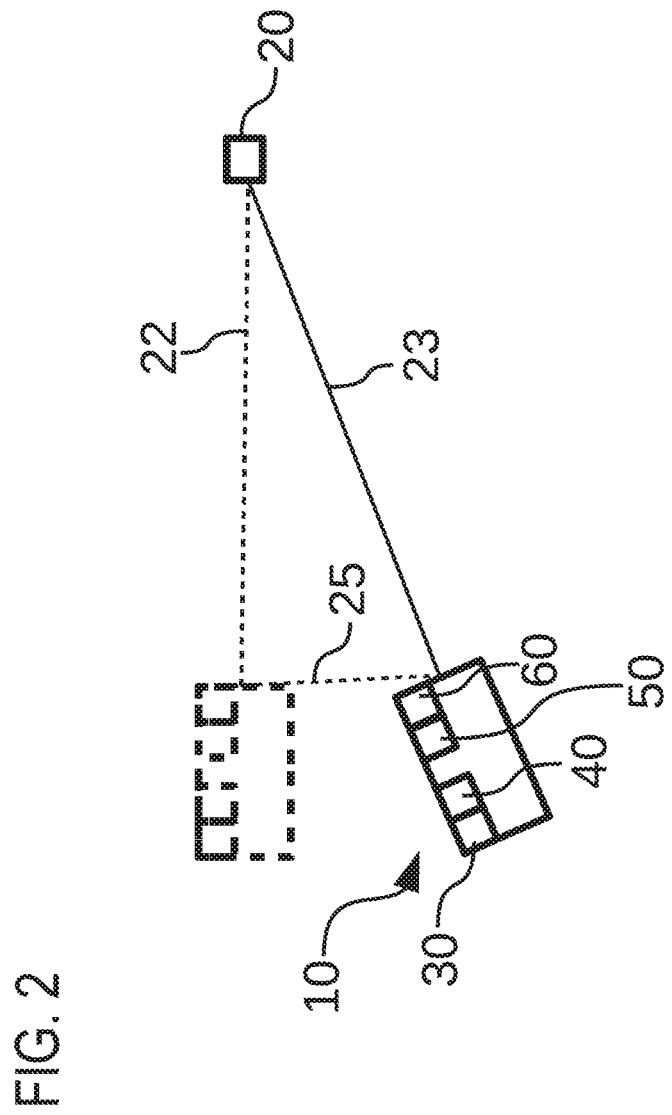
FIG. 2 shows a schematic view of the telescope located at the second telescope position according to the exemplary embodiment of the disclosure.
Figure 3:
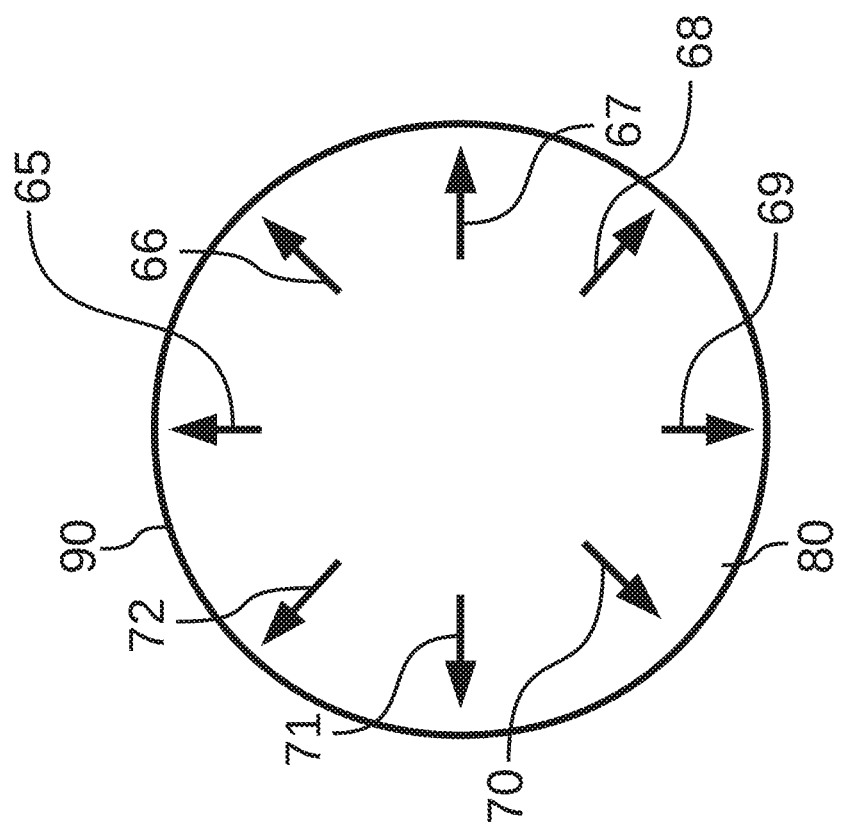
FIG. 3 shows a schematic view of the field of view of the telescope shown in FIGS. 1 and 2.

FIG. 1 shows a schematic view of a telescope 10 according to an exemplary embodiment of the disclosure, wherein the telescope 10 is located at the first telescope position. FIG. 2 shows a schematic view of the telescope 10 according to the exemplary embodiment of disclosure, wherein the telescope 10 is located at the second telescope position. FIG. 3 shows a schematic view of the field of view 80 of the telescope 10 shown in FIGS. 1 and 2.

The telescope 10 can take the form of binoculars, such as field glasses or the like, or of a monocular, such as a spotting scope, an astronomy telescope or the like.

The telescope 10 is configured for observing objects 20.

The telescope 10 has an object position determination apparatus 30 and an object aiming support apparatus 40. In addition, the telescope 10 can have a sharpness setting apparatus 50 and/or a display apparatus 60.

The method can proceed as follows: First, the telescope 10 is located at a first telescope position. The telescope position can be the origin of a coordinate system that will be used subsequently.

The user aims at an object 20 (see FIG. 1). During the aiming, the user can push a key/a button/a touch screen display of the telescope 10. In this way, the user communicates with the telescope 10 that the user has now aimed at an object which the user wishes to find again or aim at again at a later point.

It is also possible that the aiming at the object 20 is determined when the user has not significantly changed the field of view 80 for a period of time that is longer than a specified or predetermined period of time (e.g., 5 s or 10 s). Next, the first object position 22 and the first telescope position are automatically determined and stored. It is also possible for the telescope 10 to feature both modes (manual storing by pushing a button and automatic storing) and for the user to be able to switch between the two modes.

Using the object position determination apparatus 30, the telescope 10 determines the first object position 22 of the object 20 relative to the telescope 10 (which is located at the first telescope position). That means that no absolute position of the object 20 and/or of the telescope 10 in space is determined, but only the position of the object relative to the first telescope position. The first telescope position can be determined as the origin of a coordinate system.

The direction in which the viewing direction of the telescope 10 points at the first telescope position when the object is in the field of view or in the center of the field of view of the telescope 10 can be captured and stored.

This can be determined for example with position sensors, magnetic field sensors, etc. The distance from the telescope 10 to the object 20 can be determined with a rangefinder. The distance of the object 20 from the telescope 10 can also be determined by way of the set sharpness of the telescope 10.

Starting from the first telescope position and the orientation or viewing direction of the telescope 10 (and possibly the distance from the object) at the first telescope position, all the changes in position and/or viewing direction of the telescope 10 can now be captured, and so it is possible to easily determine later, at the second telescope position, where the object is located relative to the telescope 10 at the second telescope position and in which direction the viewing direction of the telescope 10 must be oriented to be able to once again aim at the object.

If the telescope 10 has moved from the first telescope position to a second telescope position (see FIG. 2, the first telescope position is illustrated by dashes), the same user or another user, i.e., a first user or a second user uses the telescope 10 at said second telescope position and wishes to find again the object 20 or aim at the object 20, which was located at the first object position 22 relative to the telescope 10 at the first telescope position, using the telescope 10.

The telescope 10 can include motion sensors. The motion sensors can include for example position sensors, magnetic field sensors and/or acceleration sensors or the like. By capturing changes in the measurement values of the motion sensors, it is possible to determine the degree to which and the direction in which (starting from the or relative to the first telescope position) the telescope 10 has moved. It is also conceivable that a smartphone that is coupled or connected to the telescope 10 has the motion sensors and that the movement of the telescope 10 from the first telescope position to the second telescope position is determined or captured in this way.

When moving the telescope 10 from the first telescope position to the second telescope position, the movement of the telescope 10 is captured. That means that it is determined how far or by what distance and in what direction the telescope 10 has moved during the movement from the first telescope position to the second telescope position. For the same user at the first telescope position and at the second telescope position, this corresponds to the movement of the user. Consequently, the difference 25 between the first telescope position and the second telescope position is determined. Differences in height between the first telescope position and the second telescope position can also be determined. A parallax error is avoided hereby.

It is also possible that the difference between the first telescope position and the second telescope position is determined only when the telescope 10 is used by the user at the second telescope position.

Based on the first telescope position, the second telescope position, and the first object position 22, the second object position 23 relative to the second telescope position is now determined. By determining or measuring the distance or difference between the first telescope position and the second telescope position 25 and of the relative position of the object relative or with respect to the first telescope position, the second object position relative to the telescope that is now located at the second telescope position can now be determined or calculated in a technically simple manner. The first telescope position can serve as the origin of a coordinate system used. The coordinate system can be a two-dimensional or a three-dimensional coordinate system.

Only relative measures or positions are used here, because the absolute positions in space are not important. For example, no GPS, no compass or the like is required. This also saves energy.

The object aiming support apparatus 40 supports the user when aiming at the object 20, located at the second object position 23 relative to the telescope 10 at the second telescope position, at the second telescope position. The user takes the telescope 10 for example at the second telescope position and places it against his eyes. The object aiming support apparatus 40 supports the user when orienting the viewing direction or the field of view 80 of the telescope 10 to aim at the object 20. The telescope 10 is the same telescope 10 that was used at the first telescope position.

The object aiming support apparatus 40 can use for example the difference between the first telescope position and the second telescope position 25 to determine or calculate the direction in which the object 20 is located with respect to the second telescope position.

The telescope 10 can include a display apparatus 60 to display the direction into which the viewing direction or the field of view 80 of the telescope 10 must be changed so it can be aimed at the object 20 again. The object aiming support apparatus 40 can control the display apparatus 60.

For example, directional arrows 65 to 72 can be visible through the eyepiece 90 or through at least one of the eyepieces 90, which are controlled by the display apparatus 60. The directional arrows 65 to 72 can for example light up and/or flash for aiming in the corresponding direction. For example, a lit or flashing directional arrow 65, which can be seen at the top of the field of view 80, can indicate to the user that the viewing direction must be lifted or moved away from the ground so as to aim at the object 20 again or to bring it into the field of view 80 of the telescope 10. Lighting up of a directional arrow 70, which points to the bottom left, indicates for example that the user must lower the viewing direction and in addition veer the viewing direction to the left so as to find or aim at the object 20 again.

If the object 20 is located in the field of view 80, in particular if the object 20 is located in the center of the field of view 80 of the telescope 10, for example all directional arrows 65 to 72 can light up so as to indicate to the user that he is looking in the correct direction.

The directional arrows 65 to 72 can be superposed on the field of view 80 or include light-emitting diodes located at the edge of the field of view 80.

In FIG. 3, for example, eight directional arrows 65 to 72 are shown, with each directional arrow 65 to 72 enclosing an angle of 45° with the immediately adjacent directional arrow 65 to 72.

Other possibilities for supporting the user are conceivable. A display on a display device of the telescope 10 is possible. An acoustic indication ("further to the left," "further to the right," "up," "down") is also possible.

With the object aiming support apparatus 40, the user can now orient the viewing direction toward the object 20 (i.e., in spherical coordinates set the azimuthal angle and the polar angle such that the object 20 is located in the field of view of the telescope 10).

It is possible that the telescope 10 has a sharpness setting apparatus 50. The sharpness setting apparatus 50 can store for example the sharpness that was set in the telescope 10 when aiming at the object 20 from the first telescope position. This sharpness can be automatically set and/or displayed when supporting the aiming at the object 20 from the second telescope position. It is likewise conceivable that the sharpness or the sharpness setting of the telescope 10 is determined in dependence on the determined distance of the second object position 23 from the second telescope position and is automatically set and/or displayed.

It is also possible that the telescope 10 stores the positions of a plurality of objects 20 relative to the first telescope position (or a first telescope position). When using the telescope 10 at the second telescope position, a plurality of different objects 20 that can be aimed at can be made available to the user. To this end, the object positions 23 of the objects 20 relative to the second telescope position are determined. The objects can be made available by way of the corresponding directional arrows 65 to 72 (for example together with further information relating to the object 20, such as date and time of first aiming) lighting up and/or by a display and/or by acoustic information. The user can select an object 20 using his voice and/or via an input (for example button and/or touch screen display). It is also possible that the user makes a direct attempt to aim the telescope 10 at an object 20 among the available objects 20 by following a directional arrow that is displayed.

The telescope 10 can recognize or determine the identity of the user for example on the basis of fingerprints of the user. To this end, the telescope 10 can have a sensor used for capturing a fingerprint and determining the identity of the user at the locations at which the thumb, the index finger, the middle finger, the ring finger, and/or the little finger are typically placed on the telescope 10 during normal holding of the telescope 10. This permits the telescope to make available to an identified user only the directions of the objects 20 that have been aimed at previously by said user.

It is also possible to make available to the user directions of objects 20 that have been aimed at previously by other users. These can be correspondingly marked, or the name of the respective user can also be displayed for said objects 20.

The data can be stored in the telescope 10 or externally, for example in a cloud, on a smartphone, on a laptop, on a tablet. It is also conceivable that all calculations take place in the telescope 10 itself or are performed externally, for example in a cloud, on a smartphone.

The object aiming support apparatus 40 can use a recorded image of the scenery around the object 20 from the first telescope position by comparing the recorded image of the scenery of the object 20 or the area surrounding it to the current field of view 80. By way of correlation and compensation or comparison of the image data, it is thus possible for the object 20 to be found again or be aimed at again by the user from the second telescope position in a technically simple manner.

If the telescope 10 is a spotting scope or another telescope 10 having a mechanical adjustment feature for the viewing direction, it is also possible that the telescope 10 automatically aims at the object 20 in the second telescope position. This can be accomplished for example by retrieving the respective object 20 or the like.

It is possible that the first telescope position and the second telescope position are substantially identical. That means that the position of the telescope 10 has substantially not changed. In this way, the telescope 10 supports the user or different users when aiming at an object 20 again, wherein the telescope 10 is located at the first telescope position.

It is of course likewise possible that the telescope 10 when being aimed at the object 20 at the first telescope position captures a movement of the object 20 relative to the telescope 10 and calculates or estimates where the object 20 would have to be located when aiming at the object 20 is intended to occur again (at the first telescope position or at the second telescope position). It is assumed that the object 20 has continued to move at a constant speed. The time that has passed since the first or last aiming at the object 20 is also determined or captured. The second object position 23 is thus the position of the object 20 after the object 20 has continued to move at the time the object 20 is aimed at again.

The object 20 can be, for example, an animal, a person, an animal, or a fixed object 20 (such as a building or mountain or plant), a celestial phenomenon (northern light, rainbow, etc.), or the like. However, the object 20 does not have to be identified.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

10 Telescope
20 Object
22 First object position
23 Second object position
25 Difference between first telescope position and second telescope position
30 Object position determination apparatus
40 Object aiming support apparatus
50 Sharpness setting apparatus
60 Display device
65-72 Directional arrows
80 Field of view
90 Eyepiece

What is claimed is:

1. A method for supporting a first user or a second user aiming at an object with a telescope, the method comprising:
   determining a first object position of the object relative to the telescope when the first user aims at the object with the telescope and the telescope is located at a first telescope position;
   storing the first object position of the object relative to the telescope; and
   supporting the first user or the second user when aiming at the object again with the telescope based on a stored first object position relative to the telescope.

2. The method as claimed in claim 1, further comprising:
   determining a second object position of the object relative to the telescope when the telescope was moved from the first telescope position to a second telescope position based on the first object position, the first telescope position, and the second telescope position; and
   supporting of the first user or the second user aiming at the object again with the telescope based on the second object position of the object relative to the telescope.

3. The method as claimed in claim 1, further comprising:
   when supporting the first user or the second user aiming at the object, displaying a direction in a field of view of the telescope, wherein the direction indicates the direction in which a viewing direction of the telescope must be changed to bring the object back into the field of view of the telescope, or into a center of the field of view.

4. The method as claimed in claim 1, further comprising:
   automatically storing the first object position relative to the telescope when a viewing direction of the telescope has not been significantly changed for a period of time that is longer than a predetermined period of time.

5. The method as claimed in claim 1, further comprising:
   determining an identity of the first user or the second user by the telescope or based on fingerprints, and
   supporting the first user or the second user aiming at the object when determining and storing the first object position of the object when the first user or the second user is aiming at the object again.

6. The method as claimed in claim 1, further comprising:
   displaying or automatically setting a sharpness value of the telescope when supporting the first user or the second user when aiming at the object, wherein the sharpness value is the sharpness value that is stored when aiming at the object at the first telescope position or is the sharpness value determined based on a distance between a second telescope position and a second object position.

7. The method as claimed in claim 1, further comprising:
   determining a plurality of second object positions of a plurality of objects relative to the telescope at a second telescope position; and
   in supporting the first user or the second user when aiming at the object, providing the plurality of second object positions of the plurality of objects to the first user for selection or displaying to the first user or the second user a respectively necessary direction of a change in a viewing direction of the telescope to bring a respective object into a field of view of the telescope together with information relating to the respective object.

8. A telescope comprising:
   an object position determination apparatus configured to determine and store a first object position of an object relative to the telescope when the object is being aimed at with the telescope by a first user and the telescope is located at a first telescope position; and
   an object aiming support apparatus configured to support the first user or a second user when aiming at the object again with the telescope based on a stored first object position relative to the telescope.

9. The telescope as claimed in claim 8, wherein:
   the object position determination apparatus is further configured to determine a second object position of the object relative to the telescope when the telescope is located at a second telescope position based on the first object position, the first telescope position, and the second telescope position, and
   the object aiming support apparatus is further configured to support the first user or the second user when aiming at the object with the telescope at the second telescope position based on the second object position relative to the telescope.

10. The telescope as claimed in claim 8, further comprising:
    a sharpness setting apparatus configured to display or automatically set a sharpness value of the telescope when supporting the first user or the second user aiming at the object at a second telescope position, and
    wherein the sharpness value is the sharpness value that is stored when aiming at the object at the first telescope position or that is determined based on a distance between the second telescope position and the object.

11. The telescope as claimed in claim 8, wherein the object position determination apparatus is configured to automatically store the first object position relative to the telescope at the first telescope position when a viewing direction of the telescope has not been significantly changed for a period of time that is longer than a predetermined period of time.

12. The telescope as claimed in claim 8, further comprising:
    a display apparatus to display a direction in a field of view of the telescope, wherein the direction displayed indicates the direction in which a viewing direction of the telescope must be changed to bring the object back into the field of view of the telescope or into a center of the field of view.

* * * * *